United States Patent
Shinohara et al.

(10) Patent No.: US 7,376,746 B2
(45) Date of Patent: May 20, 2008

(54) METHOD AND PROGRAM FOR DISCLOSING AND PROVIDING SERVICES ON NETWORK

(75) Inventors: Daisuke Shinohara, Yokohama (JP); Ryoji Furuhashi, Yokohama (JP); Hirotaka Nakagawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 196 days.

(21) Appl. No.: 10/644,936

(22) Filed: Aug. 21, 2003

(65) Prior Publication Data
US 2004/0205103 A1 Oct. 14, 2004

(30) Foreign Application Priority Data
Apr. 10, 2003 (JP) .............................. 2003-106112

(51) Int. Cl.
G06F 15/16 (2006.01)
G06F 15/177 (2006.01)
(52) U.S. Cl. ..................................... 709/232; 709/221
(58) Field of Classification Search ................. 709/224, 709/232, 229, 221
See application file for complete search history.

(56) References Cited

U.S. PATENT DOCUMENTS

| | | | |
|---|---|---|---|
| 5,768,524 A * | 6/1998 | Schmidt ..................... | 709/224 |
| 5,781,550 A * | 7/1998 | Templin et al. ............. | 370/401 |
| 5,978,779 A | 11/1999 | Stein et al. | |
| 5,996,087 A * | 11/1999 | Badovinatz et al. .......... | 714/4 |
| 5,999,978 A * | 12/1999 | Angal et al. ................ | 709/229 |
| 6,012,090 A | 1/2000 | Chung et al. | |
| 6,038,563 A * | 3/2000 | Bapat et al. ................. | 707/10 |
| 6,085,191 A * | 7/2000 | Fisher et al. ................ | 707/9 |
| 6,112,228 A * | 8/2000 | Earl et al. .................. | 709/205 |
| 6,385,651 B2 | 5/2002 | Dancs et al. | |
| 6,490,618 B1 * | 12/2002 | Ferguson et al. ........... | 709/223 |
| 6,701,316 B1 | 3/2004 | Li et al. | |
| 6,745,239 B1 | 6/2004 | Hubbard | |
| 6,836,805 B1 * | 12/2004 | Cook ......................... | 709/245 |
| 6,853,634 B1 * | 2/2005 | Davies et al. ............... | 370/349 |
| 7,072,969 B2 | 7/2006 | Tomida et al. | |
| 2001/0034791 A1 * | 10/2001 | Clubb et al. ................ | 709/238 |
| 2001/0056389 A1 | 12/2001 | Fair et al. | |
| 2002/0002579 A1 | 1/2002 | Holden et al. | |

(Continued)

OTHER PUBLICATIONS

Service Location Protocol, Version 2; Jun. 1996, IETF.

*Primary Examiner*—William Vaughn
*Assistant Examiner*—Ranodhi Serrao
(74) *Attorney, Agent, or Firm*—Mattingly, Stanger, Malur & Brundidge, P.C.

(57) ABSTRACT

When a first service providing device and a second service providing device located on a network have a dependent relationship, services can be disclosed and provided, with the dependent relationship held. A service utilizing device inquires of a service disclosing device regarding available services. The service disclosing device refers to service information and sends back, to the service utilizing device, an address of the first service providing device for providing a first service. The service providing device accepts a service request from the service utilizing device, refers to manageable target information, and issues a service request to the second service providing device by use of an address of the second service providing device being under non-disclosure. The second service providing device executes services and sends back requested information to the service utilizing device via the first service providing device.

6 Claims, 15 Drawing Sheets

U.S. PATENT DOCUMENTS

| | | |
|---|---|---|
| 2002/0120461 A1 | 8/2002 | Kirkconnell-Ewing et al. |
| 2002/0120685 A1 | 8/2002 | Srivastava et al. |
| 2002/0138546 A1 | 9/2002 | Parsonnet et al. |
| 2002/0138571 A1* | 9/2002 | Trinon et al. ............... 709/204 |
| 2002/0156876 A1 | 10/2002 | Hartman et al. |
| 2003/0041141 A1* | 2/2003 | Abdelaziz et al. .......... 709/223 |
| 2003/0050966 A1* | 3/2003 | Dutta et al. ................. 709/203 |
| 2003/0119528 A1 | 6/2003 | Pew et al. |
| 2003/0188019 A1 | 10/2003 | Wesley |
| 2003/0217099 A1* | 11/2003 | Bobde et al. ................ 709/202 |
| 2003/0229503 A1 | 12/2003 | Dan et al. |
| 2004/0002878 A1 | 1/2004 | Hinton |
| 2004/0054717 A1 | 3/2004 | Aubry et al. |
| 2004/0059704 A1 | 3/2004 | Hellerstein et al. |
| 2004/0073436 A1 | 4/2004 | Vaishnavi |
| 2004/0078475 A1 | 4/2004 | Camenisch et al. |
| 2004/0128378 A1 | 7/2004 | Blakley, III et al. |

\* cited by examiner

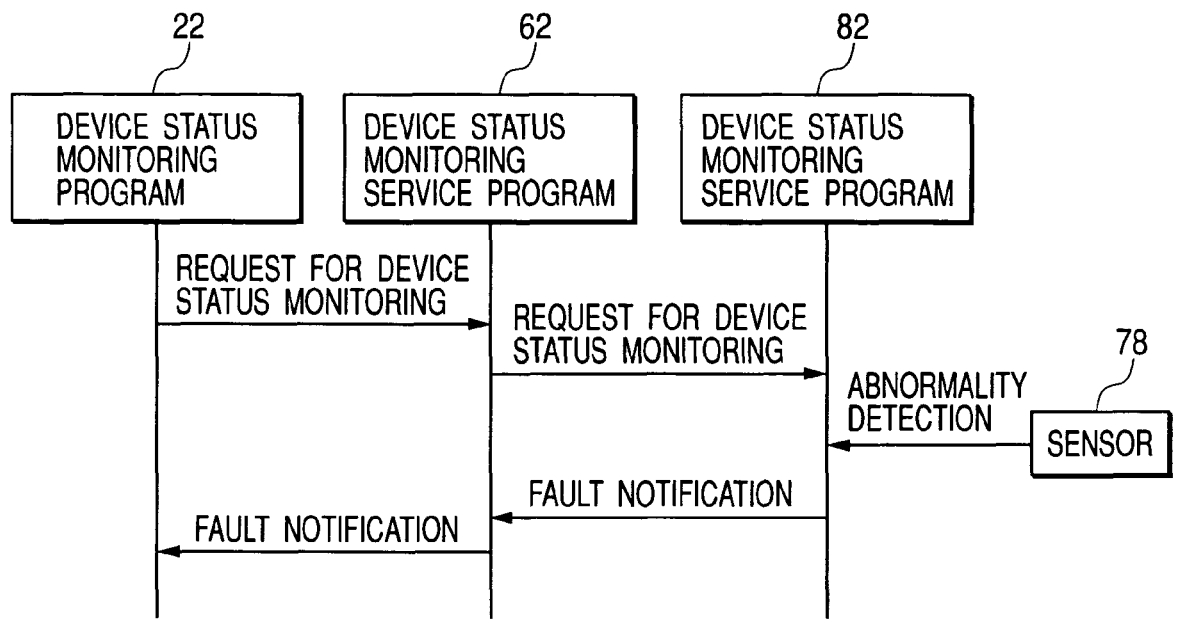

FIG. 10

SERVICE INFORMATION 44

| ID | TYPE | ADDRESS | UPPER ID |
|---|---|---|---|
| 66 | DEVICE STATUS ACQUISITION/SETTING | http://provider1/secure-mgmt-service | NONE |
| 81 | DEVICE STATUS ACQUISITION/SETTING | http://provider2/management-service | 66 |

USER INFORMATION 67

| USER ID | PASSWORD |
|---|---|
| USER1 | PASSWORD1 |
| USER2 | PASSWORD2 |
| USER3 | PASSWORD3 |

ACCESS RIGHT INFORMATION 68

| USER ID | DEVICE ID | COMPONENT ID | ACQUISITION OPERATION | SETTING OPERATION |
|---|---|---|---|---|
| USER1 | 70 | LU1 | ALLOWABLE | ALLOWABLE |
| USER1 | 70 | LU2 | ALLOWABLE | PROHIBITED |
| USER1 | 70 | PORT1 | ALLOWABLE | PROHIBITED |
| USER1 | 70 | PORT2 | PROHIBITED | PROHIBITED |

| USER ID | P13-1 |
| PASSWORD | P13-2 |
| DEVICE ID | P13-3 |
| COMPONENT ID | P13-4 |
| OPERATION NAME | P13-5 |
| OPERATION PARAMETER | P13-6 |

SERVICE INFORMATION
44

| ID | TYPE | ADDRESS | UPPER ID |
|---|---|---|---|
| 69 | DEVICE STATUS REPORT | http://provider1/report-service | NONE |
| 81 | DEVICE STATUS ACQUISITION/SETTING | http://provider2/management-service | 69 |

44-1, 44-2, 44-3, 44-4

SERVICE INFORMATION
44

| SERVICE ID | TYPE | ADDRESS |
|---|---|---|
| 1 | TYPE 1 | http://provider1/service1 |
| 2 | TYPE 2 | http://provider2/service2 |

44-1, 44-2, 44-3

METHOD AND PROGRAM FOR DISCLOSING AND PROVIDING SERVICES ON NETWORK

BACKGROUND OF THE INVENTION

The present invention relates to service disclosing and providing technologies suitable for use in network systems, and particularly to a service disclosing and providing technology having a dependent relationship between services.

It is common practice that the services of a network system comprising a service utilizing device, a service disclosing device, and one or more service providing devices have heretofore been provided to disclose all of those existing on a network.

A conventional typical service disclosing method will be explained with reference to FIGS. 18 through 24. FIG. 18 is a diagram showing one configuration example of a conventional system for disclosing services existing on a network. In FIG. 18, reference numeral 10 denotes a service utilizing device, 30 denotes a service disclosing device, 100 denotes a first service providing device, and 120 denotes a second service providing device. The service utilizing device 10, the service disclosing device 30, the first service providing device 100, and the second service providing device 120 are connected to one another via a network 90.

The service utilizing device 10 includes an input unit 11, an output unit 12, a CPU 13, a memory 14, a communications unit 15, and storage 16. A service utilizing program 25 and a service inquiry program 23 are programs stored in the storage 16 and executed by the CPU 13 after they have been read into the memory 14.

The service disclosing device 30 includes an input unit 31, an output unit 32, a CPU 33, a memory 34, a communications unit 35, and storage 36. A service inquiry processing program 41 and a service detection program 42 are programs stored in the storage 36 and executed by the CPU 33 after they have been read into the memory 34.

The first service providing device 100 includes an input unit 101, an output unit 102, a CPU 103, a memory 104, a communications unit 105, and a storage 106. A first service program 111 and a service registration program 112 are programs stored in the storage 106 and executed by the CPU 103 after they have been read into the memory 104.

The second service providing device 120 includes an input unit 121, an output unit 122, a CPU 123, a memory 124, a communications unit 125, and storage 126. A second service program 131 and a service registration program 132 are respectively programs stored in the storage 126 and executed by the CPU 123 after they have been read into the memory 124.

FIG. 19 shows service information 44 stored in the storage 36 of the service disclosing device 30. The service information 44 has, as data, a service ID 44-1 for identifying each service, a type 44-2 representing the type of service, and an address 44-3 representing the position of each service on a network. In the conventional service disclosing method, the services that have been registered in the service information 44 are all disclosed.

The flow of a process up to the registration of the services in the service information 44 will next be explained using FIGS. 20 and 21.

FIG. 20 is a diagram showing the flow of a process for registering the first service program 111 of the first service providing device 100 with the service information 44. When the first service program 111 is executed, the service registration program 112 is first started up to execute its registration. The service registration program 112 performs broadcast transmission of a service registration request to the network 90 via the communications unit 105. In doing so, the service detection program 42 being executed on the service disclosing device 30 receives the service registration request via the communications unit 35 and registers the registration-requested services with the service information 44.

FIG. 21 is a diagram showing a process for registering the second service program 131 of the second service providing device 120 in the service information 44. When the second service program 131 is executed, the service registration program 132 is started up to execute its registration in a manner similar to FIG. 20. The service registration program 132 performs broadcast transmission of a service registration request, and the service detection program 42 registers services requested for registration with the service information 44 after it has received the registration request.

The flow of a process up to the utilization of services by the service utilizing device 10 will finally be explained using FIGS. 22 through 24.

FIG. 22 is a diagram showing the flow of a process for allowing the service utilizing program 25 of the service utilizing device 10 to make an inquiry about services on the network. When the service utilizing program 25 is executed, the service inquiry program 23 is started up to make an inquiry about information of available services. The service inquiry program 23 performs broadcast transmission of a service inquiry request to the network 90 via the communications unit 15. In doing so, the service inquiry processing program 41 being executed on the service disclosing device 30 receives a registration request through the communications unit 35 and sends back a list of services that satisfy an inquiry condition of the services registered with the service information 44, as a response message.

The inquiry condition contains the type of service. Thus, in the case of an inquiry for a first type of service, the service inquiry processing program 41 sends back information about the first service program 111. In the case of an inquiry for a second type of service, the service inquiry processing program 41 sends back information about the second service program 131. When the first type and the second type are indicative of the same kind, the service inquiry processing program 41 sends back the information about the first service program 111 and the second service program 131.

FIG. 23 is a diagram showing the flow of a process for allowing the service utilizing program 25 to be served by the first service program 111. The service utilizing program 25 makes an inquiry about the first type of service under the flow of FIG. 22 to thereby obtain the information about the first service program 111. Thereafter, the service utilizing program 25 designates an address for the first service program 111 to request the first service program 111 to execute services and accepts a response obtained as the result of service execution by the first service program 111.

FIG. 24 is a diagram showing the flow of a process for allowing the service program 25 to be served by the second service program 131. The service utilizing program 25 makes an inquiry about the second type of service to thereby obtain address information on the second service program 131. Thereafter, the service utilizing program 25 designates an address for the second service program 131 to request the second service program 131 to execute services and receives a response obtained as the result of service execution by the second service program 131.

Non-Patent Document 1:

E. Guttman and three more inventors, & quot; Service Location Protocol, Version 2 & quot; [online], June 1996, IETF, [retrieved on Dec. 16, 2002], Internet: <URL:http://www.ietf.org/rfc/rfc2608.txt>

When a first service and a second service have a dependent relationship, e.g., when the first service has a security function and permits the provision of a second service only for a user having an access right, and the second service provides substantial service, it is desirable that users are not able to access the second service. According to the prior art, however, the users are able to directly make use of the second service because the service disclosing device discloses all services that meet conditions inquired by the users.

SUMMARY OF THE INVENTION

An object of the present invention is to make it possible to disclose and provide services in a state in which a dependent relationship between such services is being held.

The present invention provides a technology for disclosing and providing services where first service providing means and second service providing means located on a network have a dependent relationship. This technology is characterized by, responsive to an inquiry issued from service utilizing means, sending back by a service disclosing means a location of the first service providing means being under disclosure to the service utilizing means; receiving by the first service providing means a service request sent from the service utilizing means to request the second service providing means to provide services by using a location of the second service providing means being under non-disclosure; and sending back by the second service providing means the requested information to the service utilizing means via the first service providing means.

Incidentally, other features of the present invention become apparent from the descriptions of the present specification and the accompanying drawings.

BRIEF DESCRIPTION OF THE DRAWINGS

FIG. 4 is a flowchart depicting a device status monitoring process of the first embodiment;

FIG. 5 is a diagram showing service information of a service disclosing device employed in the first embodiment;

FIG. 10 is a diagram depicting service information of a service disclosing device employed in the second embodiment;

FIG. 11 is a diagram showing user information of a service providing device employed in the second embodiment;

FIG. 12 is a diagram illustrating access right information of the service providing device employed in the second embodiment;

FIG. 13 is a diagram showing the format of a device status acquisition/setting message employed in the second embodiment;

DESCRIPTION OF THE PREFERRED EMBODIMENTS

Preferred embodiments of the present invention will hereinafter be described with reference to the accompanying drawings.

Figure 1:
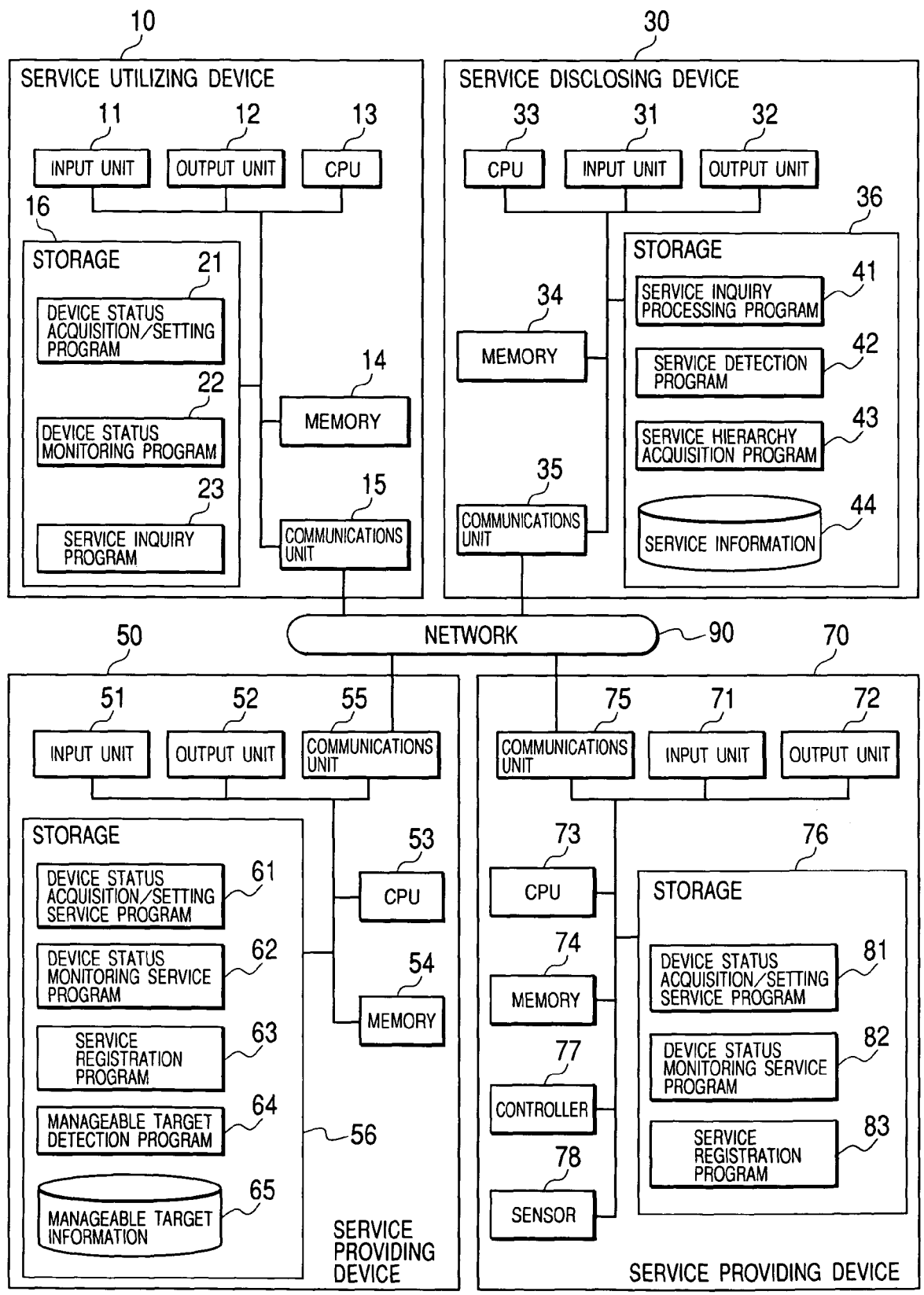
FIG. 1 is a configuration diagram of a service disclosing system according to a first embodiment.

FIG. 1 is a diagram showing a configuration of a first embodiment of the present invention, wherein services are disclosed over a network. In FIG. 1, reference numeral 10 denotes a service utilizing device, 30 denotes a service disclosing device, 50 denotes a first service providing device, and 70 denotes a second service providing device. The service utilizing device 10, the service disclosing device 30, the first service providing device 50, and the second service providing device 70 are connected to one another via a network 90.

The service utilizing device 10 includes an input unit 11, an output unit 12, a CPU 13, a memory 14, a communications unit 15, and storage 16. A device status acquisition/setting program 21, a device status monitoring program 22, and a service inquiry program 23 are programs stored in the storage 16. After the programs have been read into the memory 14, they are executed by the CPU 13.

The device status acquisition/setting program 21 is a service utilizing program provided with a user interface for acquiring the statuses of hardware or software of devices constituting a computer system connected via a network 90 and setting these statuses. The device status monitoring program 22 is a service utilizing program provided with a user interface for detecting abnormalities of the hardware or software of the devices constituting the computer system connected via the network 90. The service inquiry program 23 is a program for making inquiries about device status acquisition/setting and device status monitoring services existing on the network 90, which program is started up by the device status acquisition/setting program 21 or the device status monitoring program 22.

The service disclosing device 30 includes an input unit 31, an output unit 32, a CPU 33, a memory 34, a communications unit 35, and storage 36. A service inquiry processing program 41, a service detection program 42, and a service hierarchy acquisition program 43 are respectively programs stored in the storage 36, which are executed by the CPU 33 after they have been read into the memory 34.

The service inquiry processing program 41 is a program for providing information about services lying on the network 90 from information stored in service information 44 in response to an inquiry from a service utilizing program. The service detection program 42 is a program for detecting the services lying on the network 90 and storing the same in the service information 44. The service hierarchy acquisition program 43 is a program for acquiring a dependent relationship between the services registered in the service information 44.

The first service providing device 50 includes an input unit 51, an output unit 52, a CPU 53, a memory 54, a communications unit 55, and storage 56. A device status acquisition/setting service program 61, a device status monitoring service program 62, a service registration program 63, and a manageable target detection program 64 are programs stored in the storage 56, which are executed by the CPU 53 after they have been read into the memory 54.

In response to a request for a service utilizing program, the device status acquisition/setting service program 61 starts up the corresponding service program registered with manageable target information 65, thereby acquires the statuses of the hardware or software of the devices constituting the computer system, and sets these statuses. The device status monitoring service program 62 starts up the corresponding service program registered in the manageable target information 65, and detects abnormalities of the hardware or software of the system-constituting devices. The service registration program 63 is a program for registering information about the device status acquisition/setting service program 61 and the device status monitoring service program 62 with the service disclosing device 30. The manageable target detection program 64 is a program for detecting or registering service programs capable of providing services through the device status acquisition/setting service program 61 and the device status monitoring service program 62. A list of the service programs capable of providing the services through the device status acquisition/setting service program 61 and the device status monitoring service program 62 is stored in the manageable target information 65.

The second service providing device 70 is provided with an input unit 71, an output unit 72, a CPU 73, a memory 74, a communications unit 75, storage 76, a controller 77, and a sensor 78. The controller 77 is built in the corresponding device constituting the system and has a mechanism for reading or setting the status of the device. The sensor 78 is connected to an interface such as a bus in the device and detects the status of hardware/software of the device. A device status acquisition/setting service program 81, a device status monitoring service program 82, and a service registration program 83 are programs stored in the storage 76, which are executed by the CPU 73 after they have been read into the memory 74.

The device status acquisition/setting service program 81 is a program for, in response to a request from a service utilizing program, acquiring information about the hardware or software of the second service providing device 70 through the controller 77 and setting these information. The device status monitoring service program 82 is a program for monitoring the statuses of the hardware or software of the second service providing device 70 through the sensor 78 and notifying the registered service utilizing program of a fault upon detection of an abnormality. The service registration program 83 is a program for registering information about the device status acquisition/setting service program 81 and the device status monitoring service program 82 with the service disclosing device 30. The second service providing device 70 can be provided for every target devices constituting the system.

Figures 2, 3:
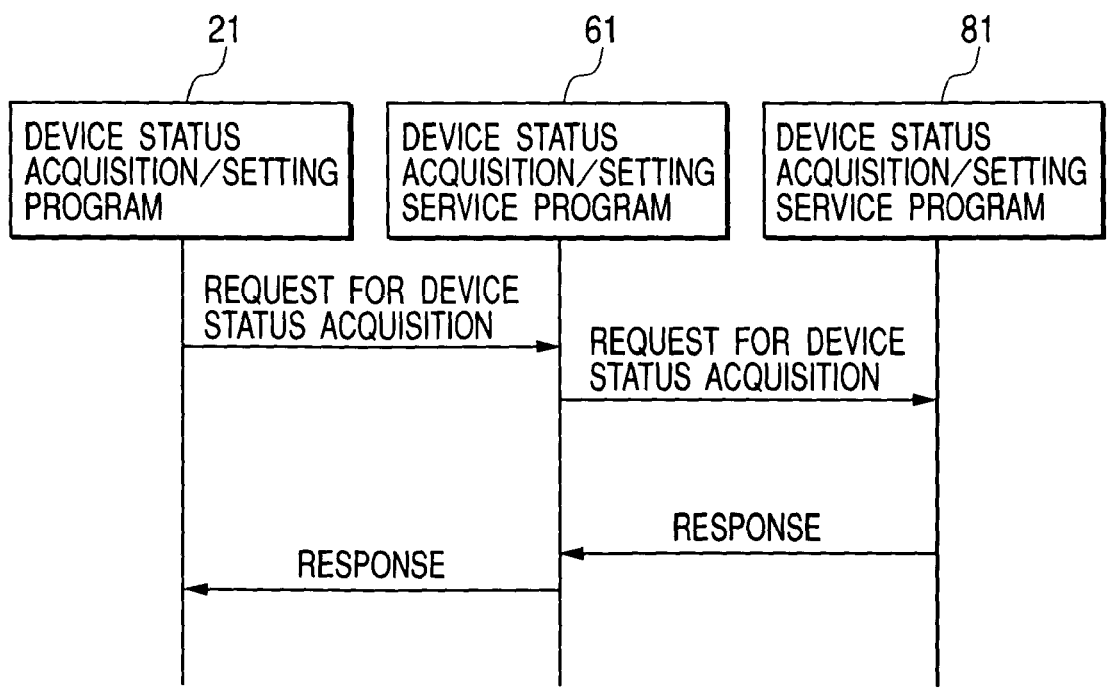
FIG. 2 is a diagram illustrating manageable target information of a service providing device employed in the first embodiment.
FIG. 3 is a flowchart showing a device status acquiring process of the first embodiment.

FIG. 2 shows a data format of the manageable target information 65 stored in the storage 56 of the first service providing device 50. The manageable target information 65 has, as data, a service ID 65-1 for identifying each service, a type 65-2 representing the type of service, and an address 65-3 representing the location of each service on the network.

FIG. 3 is a diagram showing the flow of a process for allowing the device status acquisition/setting program 21 of the service utilizing device 10 to acquire the information about the hardware or software of the second service providing device 70. The device status acquisition/setting program 21 may acquire the information about the device's hardware or software provided by the second service providing device 70. In this case, the device status acquisition/setting program 21 first transmits a request for device status acquisition to the device status acquisition/setting service program 61 of the first service providing device 50 without directly communicating with the device status acquisition/setting service program 81 of the second service providing device 70. This device status acquisition request designates the type of device constituting the system. Thereafter, the device status acquisition/setting service program 61 transmits a request for device status acquisition to the device status acquisition/setting service program 81 and sends back its response to the device status acquisition/setting program 21. Although a procedure for making a request for device status setting is similar to the above, the device status setting request contains the type of device and setting parameters.

FIG. 4 is a diagram showing the flow of a process for executing a fault notification from the device status monitoring service program 82 to the device status monitoring program 22 in case an abnormality occurs in the hardware or software of the second service providing device 70.

First of all, the device status monitoring program 22 transmits a request for device status monitoring to the device status monitoring service program 62 of the first service providing device 50. The device status monitoring request designates the type of device constituting the system. Thereafter, the device status monitoring service program 62 sends a request for device status monitoring to the device status monitoring service program 82. When the device status monitoring service program 82 detects an abnormality of the hardware or software of the second service providing device 70 through the sensor 78, it issues a fault notification to the registered service utilizing program in response to the device status monitoring request.

FIG. 5 shows a data format of the service information 44 stored in the storage 36 of the service disclosing device 30. The service information 44 has, as data, a service ID 44-1 for identifying each service, a type 44-2 representing the type of service, an address 44-3 representing the location of each service on the network, and an upper service ID 44-4 for identifying services being in an mutual dependent relationship.

The service of ID61 is a service for performing status acquisition/setting of the corresponding device being in operation at the first service providing device 50. The service of ID62 is a service for carrying out status monitoring of the device being in operation at the first service providing device 50. The service of ID61 and the service of ID62 are disclosed because they have no upper services.

The service of ID81 is a service for performing status acquisition or setting of the corresponding device being in operation at the second service providing device 70 and includes the service of ID61 corresponding to the same type as an upper service. Thus, since the service utilizing program makes use of the service of ID81 through the service of ID61, the service of ID81 is not disclosed.

The service of ID82 is a service for monitoring the status of the device being in operation at the second service providing device 70 and includes the service of ID62 corresponding to the same type as an upper service. Thus, since the service utilizing program makes use of the service of ID82 through the service of ID62, the service of ID82 is not disclosed.

Figure 6:
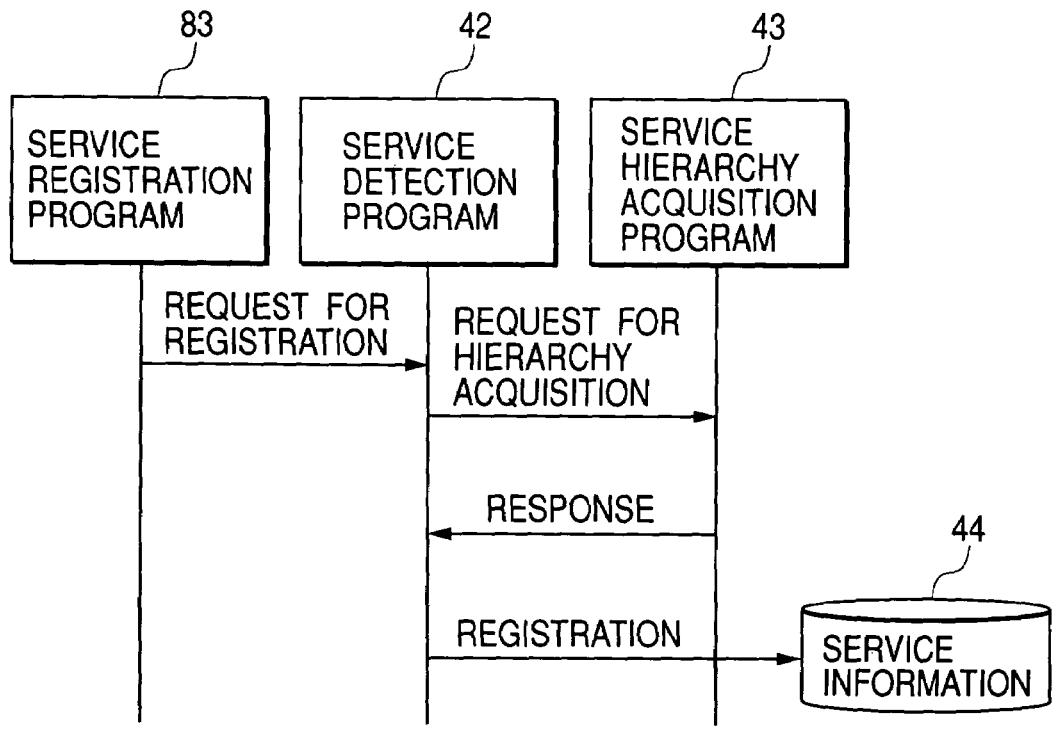
FIG. 6 is a flowchart illustrating a service registering process of the first embodiment.

FIG. 6 is a diagram showing the flow of a process for registering the device status acquisition/setting service program 81 or device status monitoring service program 82 of the second service providing device 70 with the service information 44. Incidentally, assume that the device status acquisition/setting service program 81 and the device status monitoring service program 82 have already been registered with the manageable target information 65 as shown in FIG. 2.

The device status acquisition/setting service program 81 or the device status monitoring service program 82 starts up or activates the service registration program 83 to make a request for service registration. This registration request is accompanied by the service ID 44-1, type 44-2, and address 44-3. The service registration program 83 performs broadcast transmission of the service registration request to the network 90 via the communications unit 75. In doing so, the service detection program 42 being in execution on the service disclosing device 30 receives the registration request via the communications unit 35. When the service detection program 42 receives the registration request therein, it activates the service hierarchy acquisition program 43 to acquire service hierarchy information representing the relationship of mutual dependence between services from the first service providing device 50. The service hierarchy information is accompanied by the service ID44-1, type 44-2 and address 44-3 of a registration-requested service, and the type 44-2 and address 44-3 of its upper service. When the service detection program 42 acquires the service hierarchy information, it sets the service ID 44-1 of the upper service and registers its service with the service information 44. The dependent relationship between the services is registered with its corresponding upper service ID column 44-4 of the service information 44.

Figure 7:
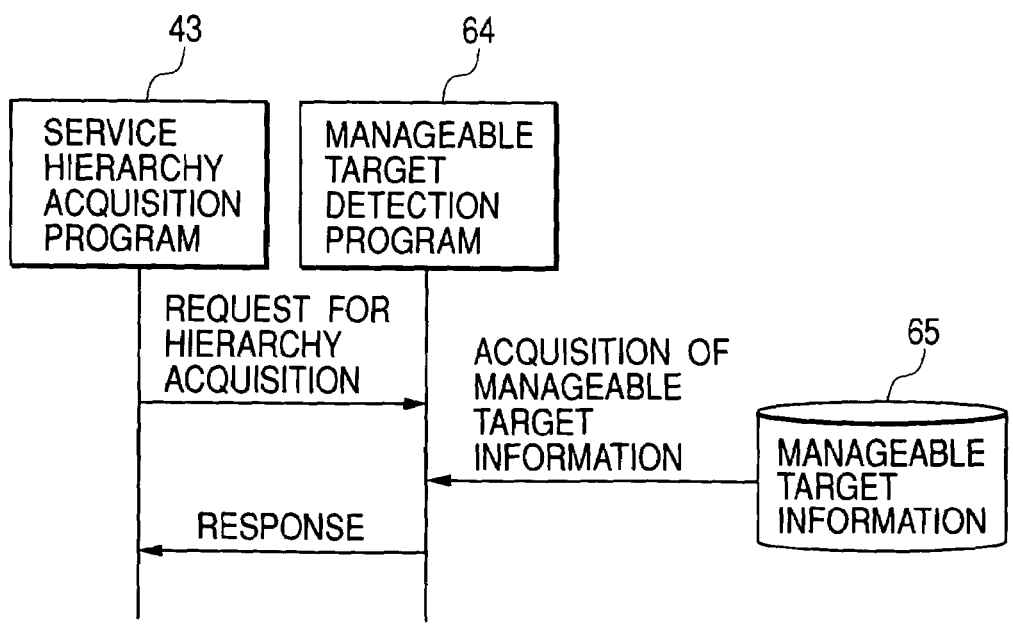
FIG. 7 is a flowchart depicting a service hierarchy acquiring process of the first embodiment.

FIG. 7 is a diagram showing the flow of a process for allowing the service hierarchy acquisition program 43 to acquire a service hierarchy. When the service hierarchy acquisition program 43 is started up by the service detection program 42, it transmits a request for acquisition of a service hierarchy representing a dependent relationship between services to the manageable target detection program 64 of the first service providing device 50. The present hierarchy acquisition request is accompanied by the service ID 44-1, type 44-2 and address 44-3 of a registration-required service. When the manageable target detection program 64 receives the hierarchy acquisition request therein, it reads information about the service providing device to be managed from the manageable target information 65 stored in the storage 56. Then the manageable target detection program 64 sets an upper service of the corresponding service program of the second service providing device 70 intended for the hierarchy acquisition request as its corresponding service program of the first service providing device 50, and sends back service hierarchy information to the service hierarchy acquisition program 43.

Figure 8:
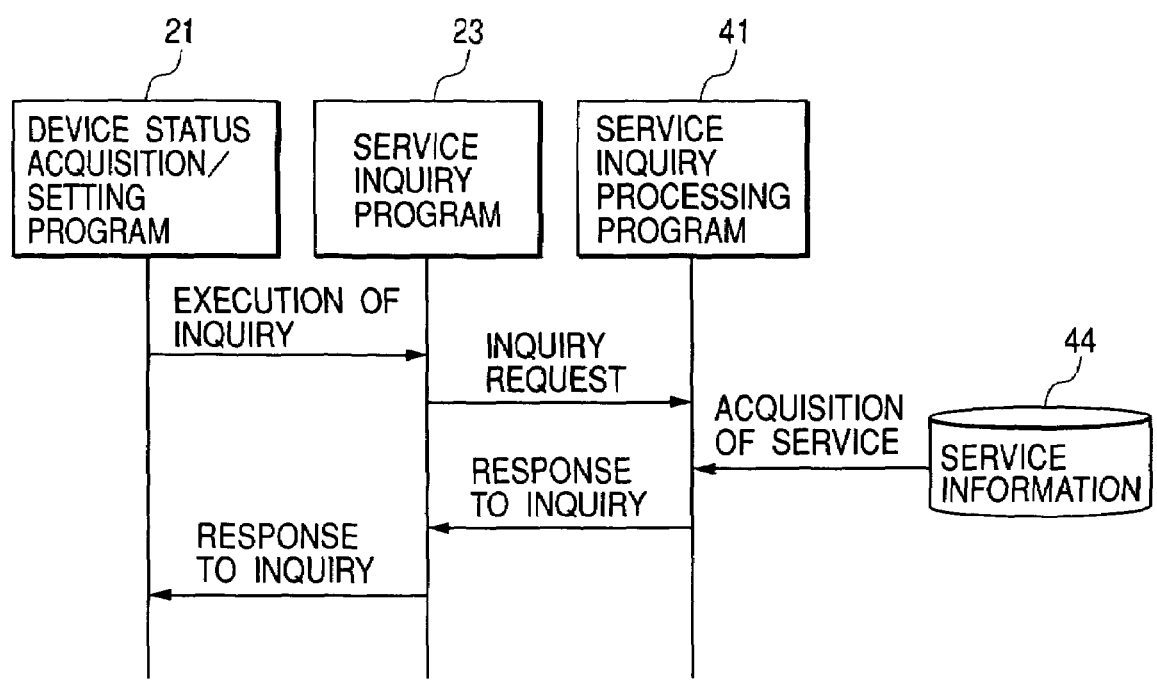
FIG. 8 is a flowchart showing a service inquiring process of the first embodiment.

FIG. 8 is a diagram showing the flow of a process for allowing the device status acquisition/setting program 21 of the service utilizing device 10 to make an inquiry about each service on the network 90. When the device status acquisition/setting program 21 is executed, the service inquiry program 23 is first started up to make an inquiry about information on device status acquisition/setting services. The service inquiry program 23 performs broadcast transmission of a service inquiry request to the network 90 via the communications unit 15. In doing so, the service inquiry processing program 41 being executed on the service disclosing device 30 receives the service inquiry request via the communications unit 35 and sends back a list of disclosable services that satisfy an inquiry condition from within the services registered with the service information 44. Here, the inquiry condition is to designate one or more types 44-2.

The device status acquisition/setting program 21 acquires an address for the device status acquisition/setting service program 61 as an inquiry response. Next, the device status acquisition/setting program 21 issues a request for device status acquisition or a request for device status setting to the device status acquisition/setting service program 61. The device status acquisition/setting service program 61 issues a request for device status acquisition or a request for device status setting to the device status acquisition/setting service program 81, receives its response therein and sends it back to the device status acquisition/setting program 21. A procedure for allowing the device status monitoring program 22 to obtain access to the device status monitoring service program 82 is similar to the above. The device status monitoring program 22 receives a fault notification from the device status monitoring service program 82 via the device status monitoring service program 62.

Figure 9:
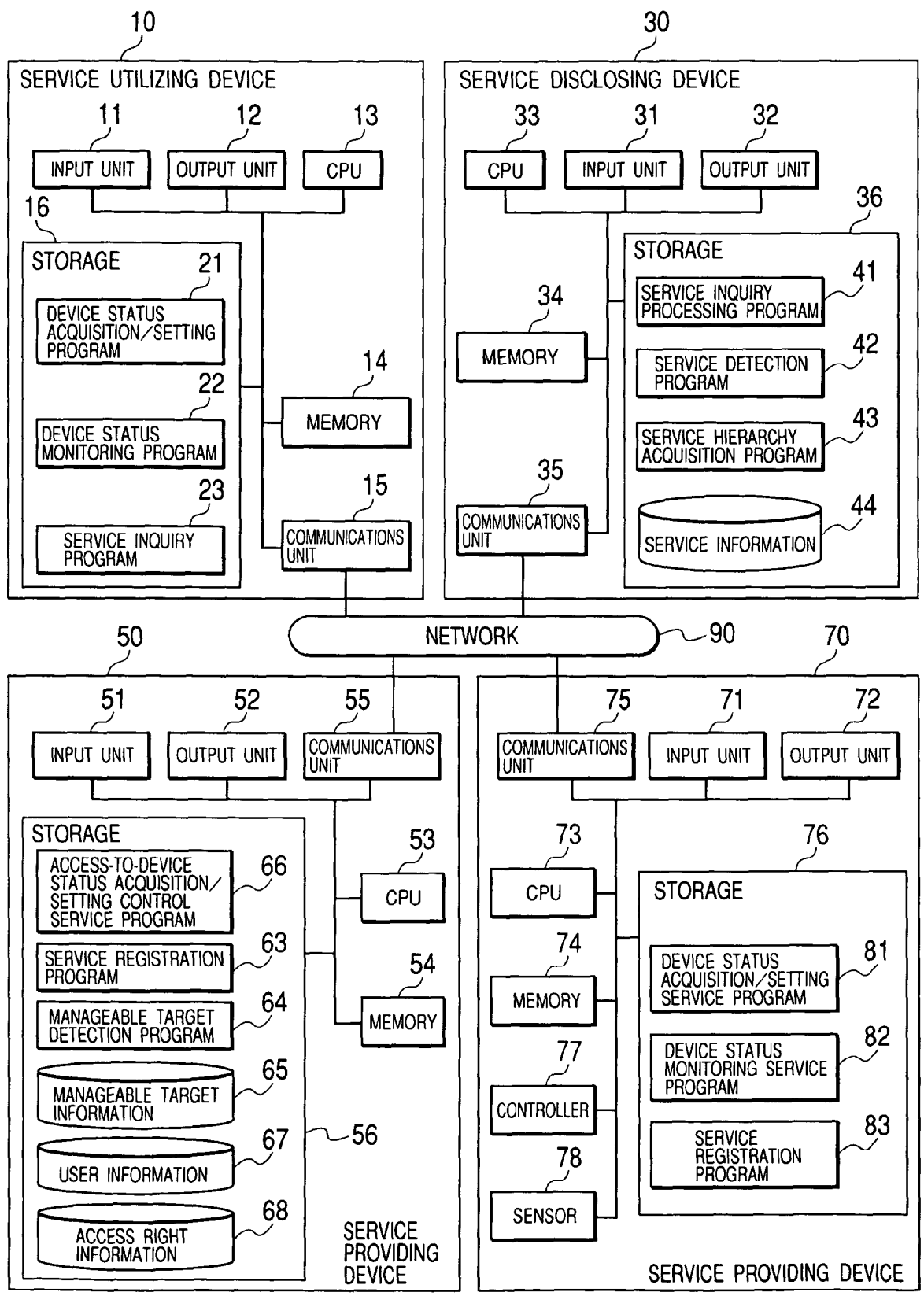
FIG. 9 is a configuration diagram illustrating a service disclosing system according to a second embodiment.

FIG. 9 is a diagram showing a configuration of a second embodiment illustrative of a method of disclosing a service on a network in accordance with the present invention. The second embodiment illustrates an example in which a second service is worth executing a security management and has such a dependent relationship with a first service that the second service is utilized through the security management by the first service.

In FIG. 9, reference numeral 10 denotes a service utilizing device, 30 denotes a service disclosing device, 50 denotes a first service providing device, and 70 denotes a second service providing device. The service utilizing device 10, the service disclosing device 30, the first service providing device 50, and the second service providing device 70 are connected to one another via a network 90. The service utilizing device 10, service disclosing device 30, and second service providing device 70 are respectively identical in configuration to those shown in FIG. 1.

The first service providing device 50 includes an input unit 51, an output unit 52, a CPU 53, a memory 54, a communications unit 55, and storage 56. An access-to-device status acquisition/setting control service program 66, a device status monitoring service program 62, a service registration program 63, and a manageable target detection program 64 are programs stored in the storage 56 and executed by the CPU 53 after they have been read into the memory 54. The service registration program 63 and manageable target detection program 64 are programs identical, respectively, to those shown in FIG. 1. Only when a user has an access right, the access-to-device status acquisition/setting control service program 66 starts up or activates a corresponding service program registered with manageable target information 65 in response to a request from a service utilizing program to thereby acquire the statuses of hardware or software of the devices constituting a system and set these statuses. The type of its service corresponds to device status acquisition/setting of service information 44. That is, the access-to-device status acquisition/setting control service program 66 exercises control on access rights in addition to acquisition/setting of each device status via an interface common to the device status acquisition/setting service program 61.

FIG. 10 shows a data format of the service information 44 stored in the storage 36 of the service disclosing device 30. In a manner similar to FIG. 5, the service information 44 has, as data, a service ID 44-1 for identifying each service, a type 44-2 representing the type of service, an address 44-3 representing the location of each service on a network, and an upper service ID 44-4 for identifying services being in a mutual dependent relationship.

The service of ID66 is a service for performing status acquisition/setting of a device being in operation at the first service providing device 50 and is disclosed because it has no upper service. The service of ID81 is a service for performing status acquisition or setting of a device being in operation at the second service providing device 70 and has the service of ID66 corresponding to the same type as an upper service. Thus, since the device status acquisition/setting program 21 determines through the service of ID66 whether or not to have an access right, and makes use of the service of ID81 in this condition, the service of ID81 is not disclosed.

FIG. 11 shows a data format of user information 67 stored in the storage 56 of the first service providing device 50. The user information 67 has a user ID 67-1 for identifying each user, and a password 67-2 of each user as data.

FIG. 12 shows a data format of access right information 68 stored in the storage 56 of the first service providing device 50. The access right information 68 includes, as data, a user ID 68-1 for identifying each user, a device ID 68-2 for identifying each system constituting device for executing an operation, a component ID 68-3 for identifying each component lying in the device for executing the operation, an acquisition operation 68-4 representing whether an acquisition operation is allowed or prohibited, and a setting operation 68-5 representing whether a setting operation is permitted or prohibited.

FIG. 13 is a diagram showing a data format of a request message P13 transmitted from the device status acquisition/setting program 21 upon utilizing the service of the access-to-device status acquisition/setting control service program 66. The request message P13 contains a user ID for identifying each user who makes use of service, a password P13-2, a device ID P13-3 for identifying a device defined as a target for performing acquisition or setting of a device status, a component ID P13-4 for identifying each component, an operation name P13-5 representing an acquisition or setting operation, and an operation parameter P13-6.

Figure 14:
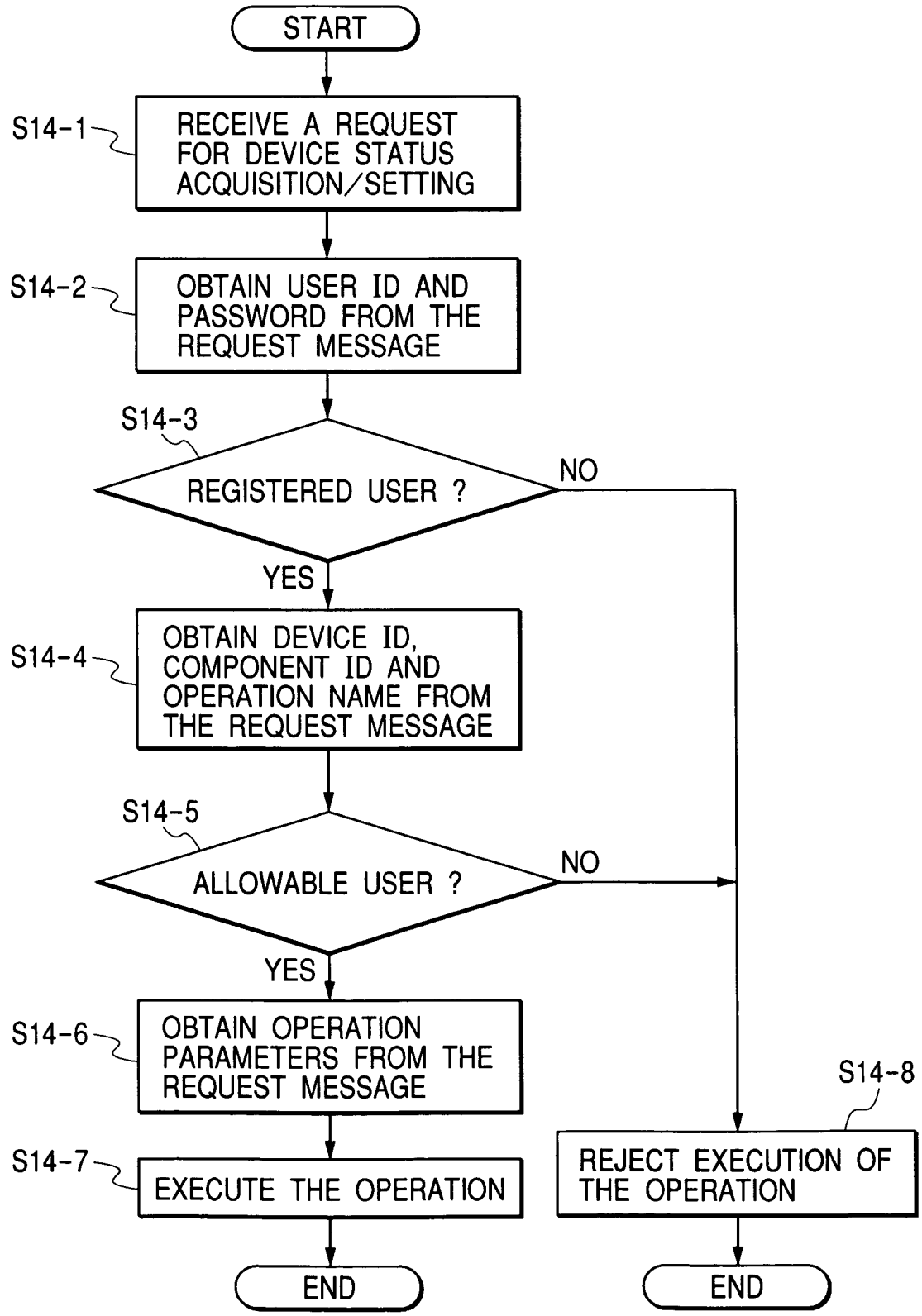
FIG. 14 is a flowchart illustrating a device status acquisition/setting process employed in the second embodiment.

FIG. 14 is a diagram showing the flow of a process from the reception of a request for device status acquisition or setting from the device status acquisition/setting program 21 by the access-to-device status acquisition/setting control service program 66 to the sending-back of its response. The access-to-device status acquisition/setting control service program 66 receives a request for device status acquisition or setting from the device status acquisition/setting program 21 as a request message P13 at Step 14-1 (S14-1). At Step 14-2, the access-to-device status acquisition/setting control service program 66 obtains a user ID and a password from the request message P13. At Step 14-3, the access-to-device status acquisition/setting control service program 66 determines whether or not a set or pair of the user ID and password contained in the request message P13 coincides with any row of the user information 67. If the determination made in Step 14-3 is No, then the access-to-device status acquisition/setting control service program 66 proceeds to Step 14-8, where it rejects execution of the operation and transmits an error message.

If the determination made in Step 14-3 is found to be Yes, then the access-to-device status acquisition/setting control service program 66 proceeds to Step 14-4, where it acquires a device ID, a component ID and an operation name from the received request message P13. At Step 14-5, the access-to-device status acquisition/setting control service program 66 determines using the access right information 68 whether or not the operation on each of the device ID and component ID contained in the corresponding request has been permitted. If the determination made in Step 14-5 is found to be No, then the access-to-device status acquisition/setting control service program 66 proceeds to Step 14-8, where it rejects execution of the operation and transmits an error message. If the determination made in Step 14-5 is found to be Yes, then the access-to-device status acquisition/setting control service program 66 proceeds to Step 14-6, where it acquires operation parameters from the request message P13. Next, at Step 14-7, the access-to-device status acquisition/setting control service program 66 executes the requested operation. Further, the access-to-device status acquisition/setting control service program 66 transmits a response message containing a status code indicative of the success or unsuccess of the execution of the operation.

Figure 15:
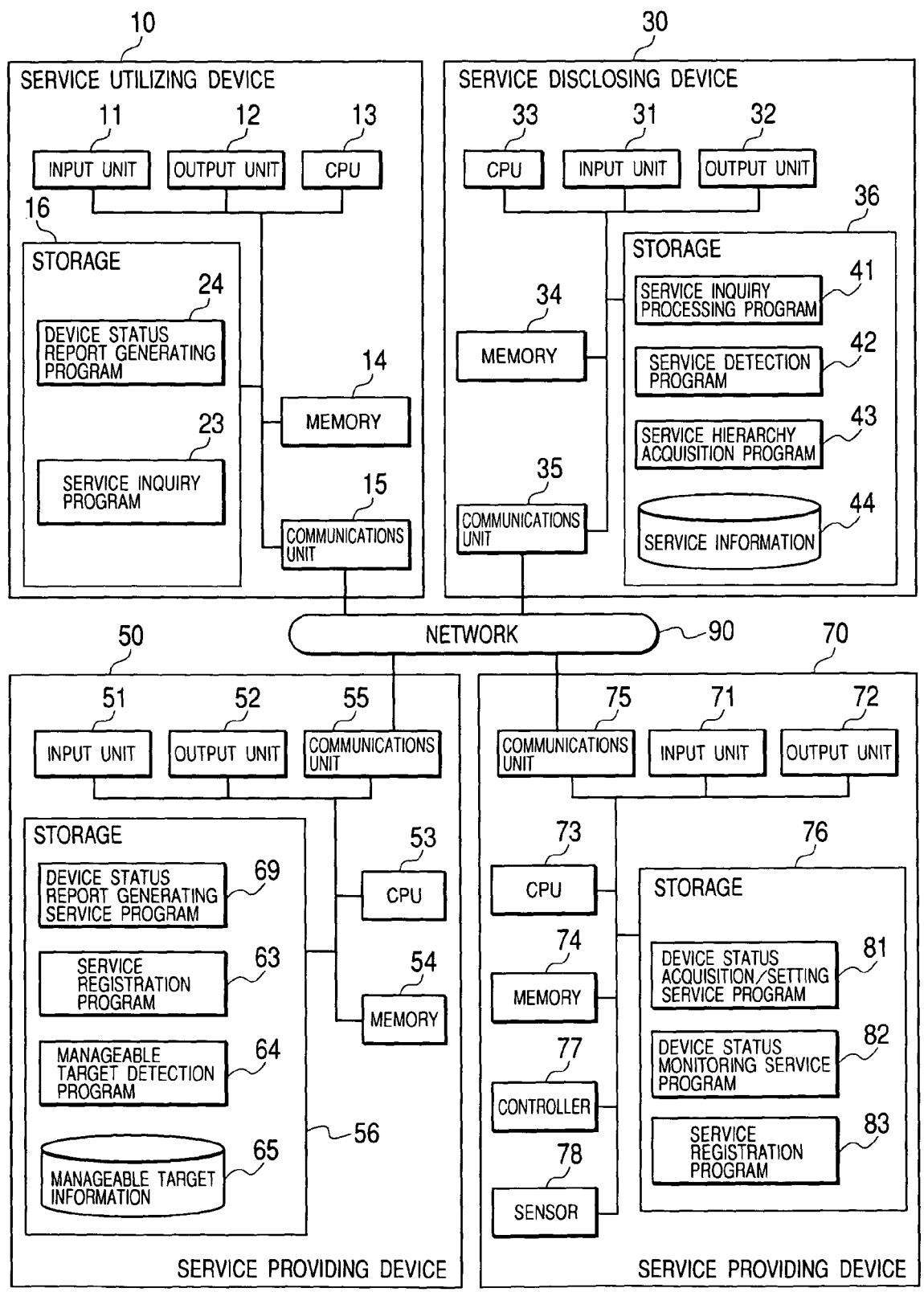
FIG. 15 is a configuration diagram showing a service disclosing system according to a third embodiment.

FIG. 15 is a diagram showing a configuration of a third embodiment illustrative of a method of disclosing a service on a network in accordance with the invention. The third embodiment is an example where a first service has a dependent relationship with a second service in utilizing the second service.

In FIG. 15, reference numeral 10 denotes a service utilizing device, 30 denotes a service disclosing device, 50 denotes a first service providing device, and 70 denotes a second service providing device. The service utilizing device 10, the service disclosing device 30, the first service providing device 50, and the second service providing device 70 are connected to one another via a network 90. The service disclosing device 30 and the second service providing device 70 are respectively identical in configuration to those shown in FIG. 1.

The first utilizing device 10 includes an input unit 11, an output unit 12, a CPU 13, a memory 14, a communications unit 15, and storage 16. A device status report generating program 24 and a service inquiry program 23 are programs stored in the storage 16 and are executed by the CPU 13 after they have been read into the memory 14. The device status report generating program 24 is a service utilizing program provided with a user interface for generating a report of the statuses of hardware or software of devices constituting a system connected via a network 90.

The first service providing device 50 includes an input unit 51, an output unit 52, a CPU 53, memory 54, a communications unit 55, and storage 56. A device status report generating service program 69, a service registration program 63, and a manageable target detection program 64 are programs stored in the storage 56 and are executed by the CPU 53 after they have been read into the memory 54. The service registration program 63 and the manageable target detection program 64 are programs identical, respectively, to those shown in FIG. 1. The device status report generating service program 69 is a program for acquiring the statuses of the hardware or software of the system-constituting devices, registered with a manageable target information 65 and generating a report of the same. The manageable target information 65 is set so as to be able to identify each device constituting the computer system according to its type 65-2.

Figures 16, 17:
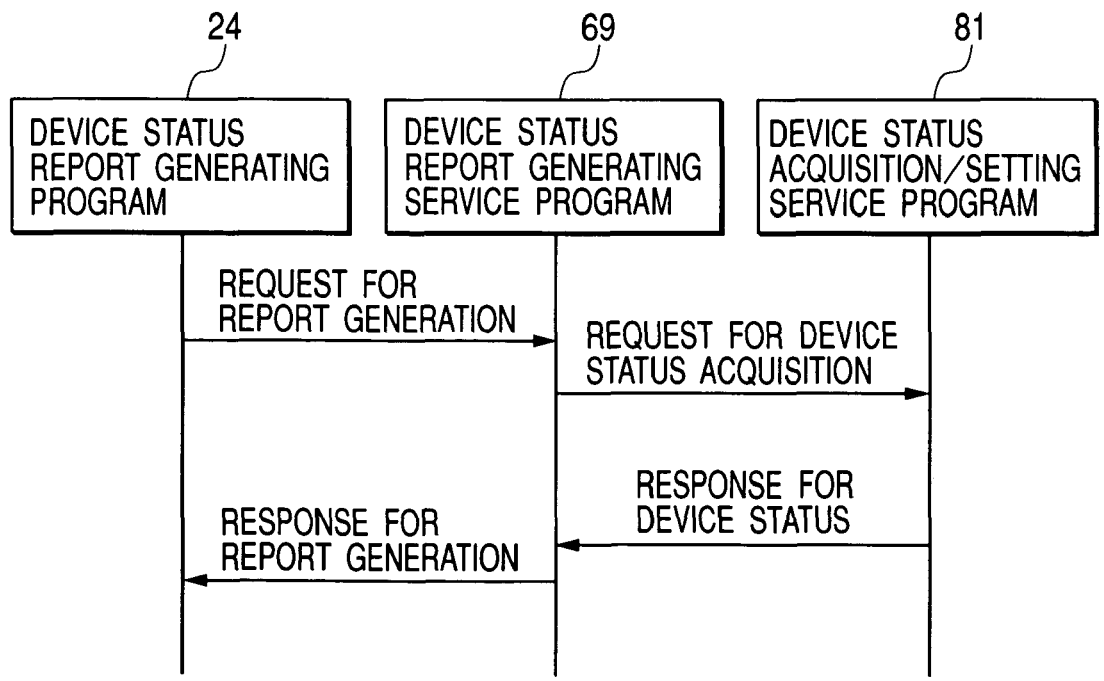
FIG. 16 is a diagram illustrating service information of a service disclosing device employed in the third embodiment.
FIG. 17 is a flowchart showing a device status report generating process employed in the third embodiment.
Figure 18:
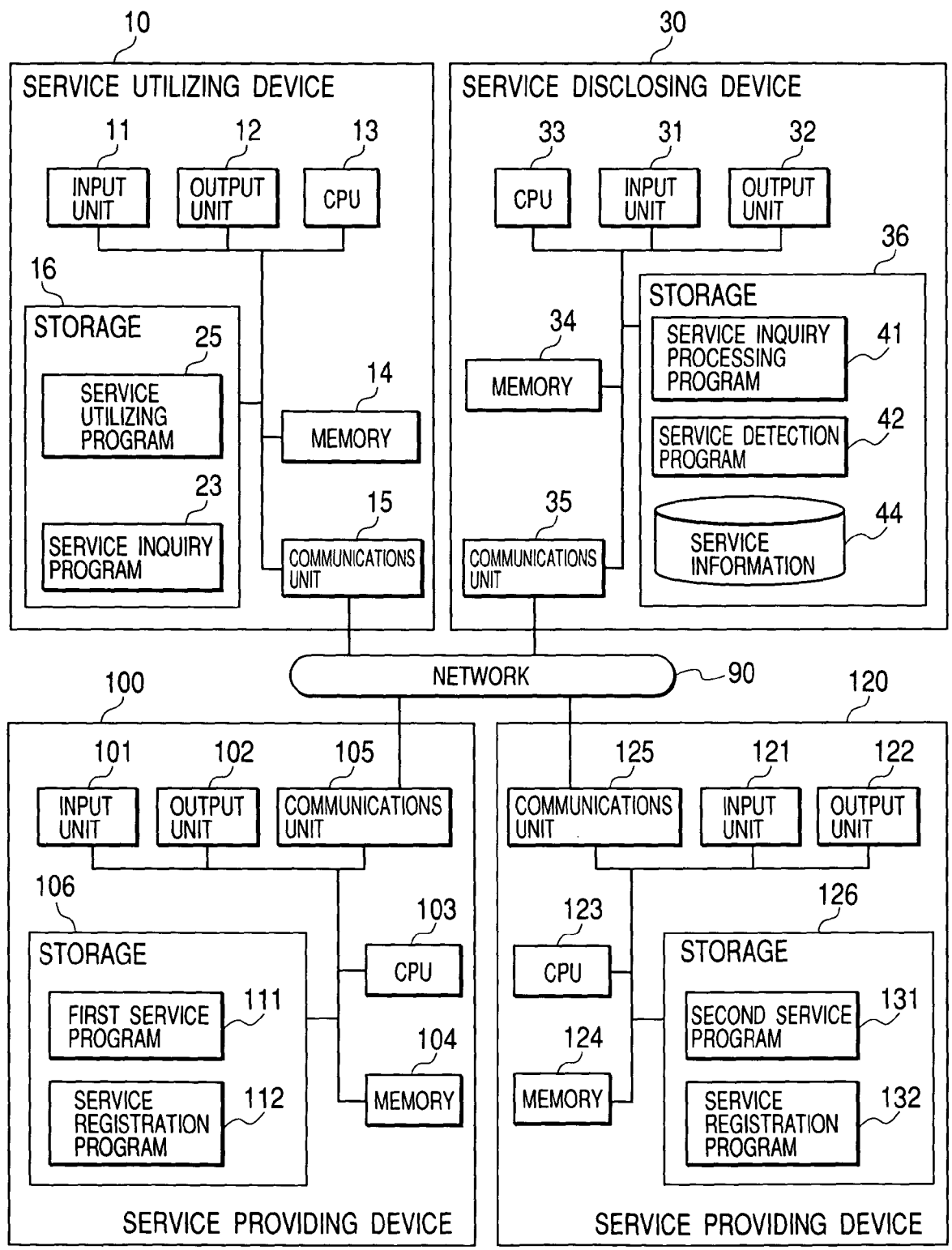
FIG. 18 is a diagram depicting one configuration example of a service disclosing system according to a prior art.
Figures 19, 20:
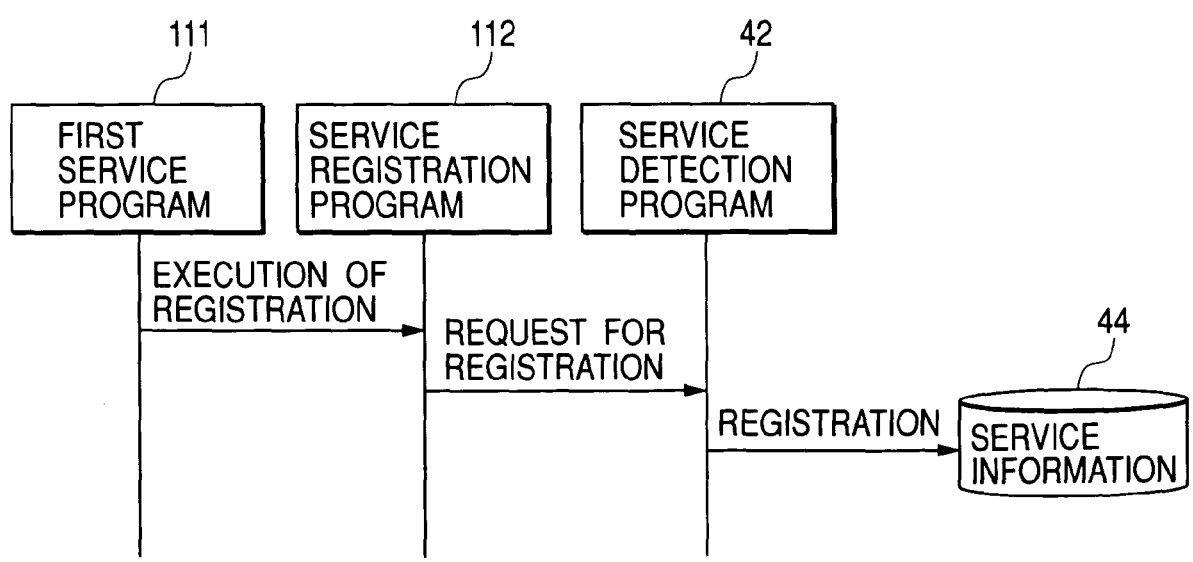
FIG. 19 is a diagram showing service information of a service disclosing device employed in the prior art.
FIG. 20 is a flowchart illustrating a service registering process employed in the prior art.
Figure 21:
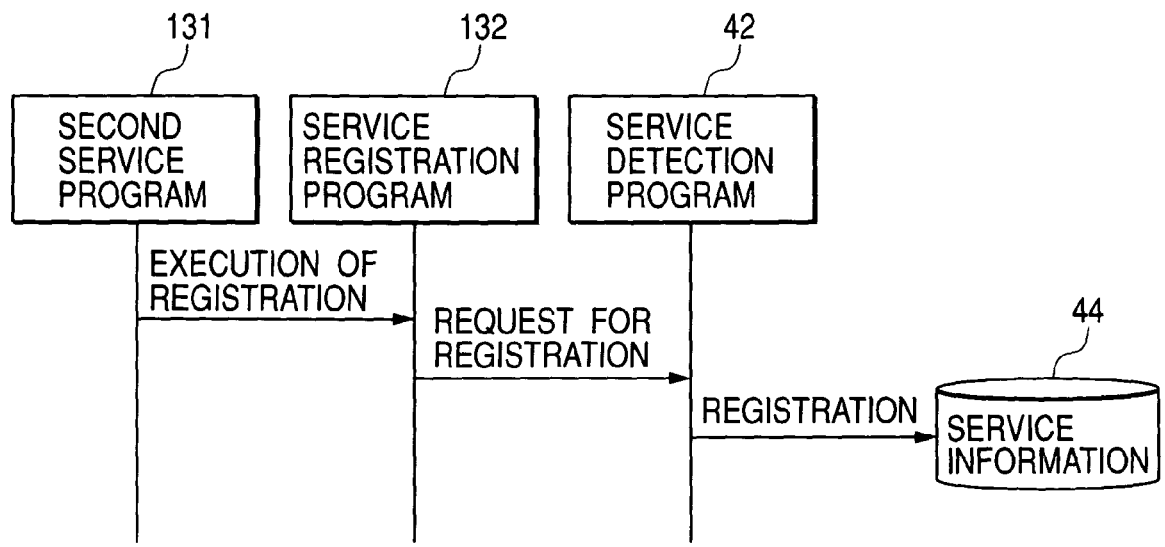
FIG. 21 is a flowchart depicting a service registering process employed in the prior art.
Figure 22:
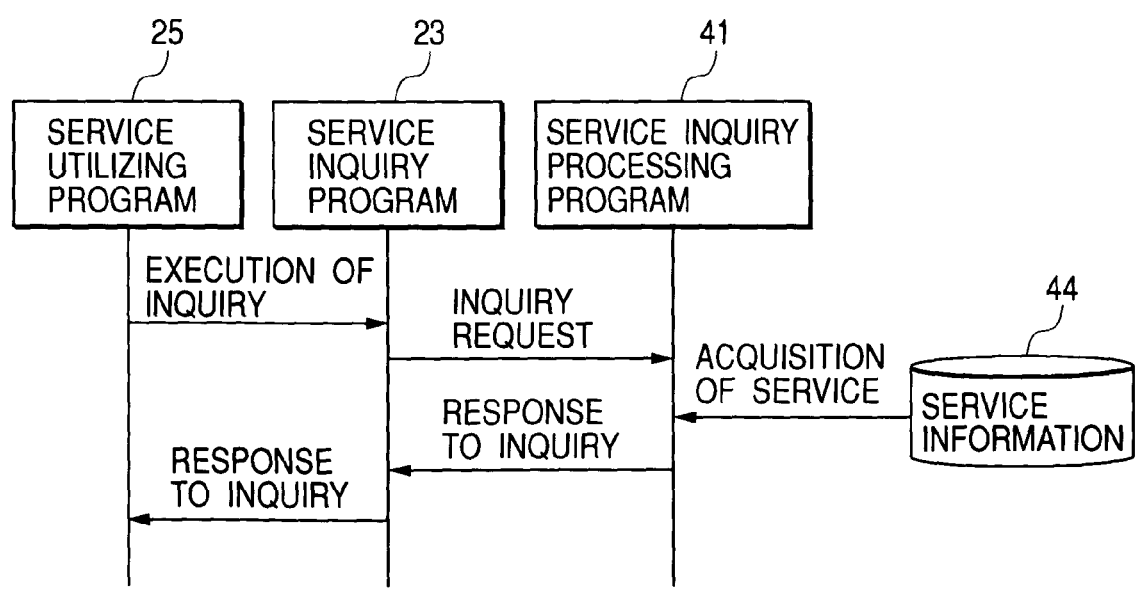
FIG. 22 is a flowchart showing a service inquiring process employed in the prior art.
Figure 23:
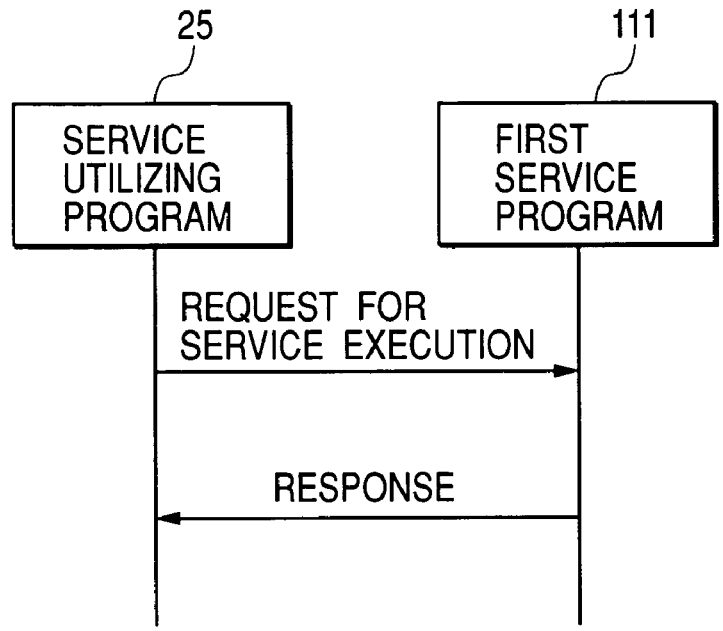
FIG. 23 is a diagram illustrating a service utilizing process employed in the prior art.
Figure 24:
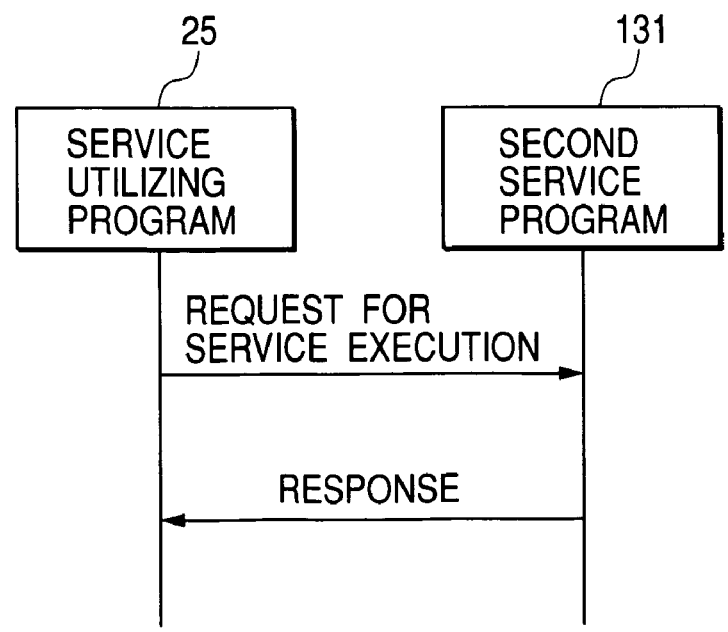
FIG. 24 is a flowchart showing a service utilizing/responding process employed in the prior art.

FIG. 16 shows service information 44 stored in the storage 36 of the service disclosing device 30. As is the case with FIG. 5, the service information 44 has, as data, a service ID 44-1 for identifying each service, a type 44-2 representing the type of service, an address 44-3 representing the location of each service on a network, and an upper service ID 44-4 for identifying services being in a mutual dependent relationship. The service of ID69 is a service for generating a report of the status of the corresponding device being in operation at the first service providing device 50, and is disclosed because it has no upper service. The service of ID81 is a service for performing status acquisition/setting of the corresponding device being in operation at the second service providing device 70, and has the service of ID69 corresponding to a different type as an upper service. Thus, since the service utilizing program indirectly utilizes the service of ID81 through the service of ID69, the service of ID81 is not disclosed.

FIG. 17 is a diagram showing the flow of a process for allowing the device status report generating program 24 of the service utilizing device 10 to generate a report of the status of hardware or software of the second service providing device 70. When the device status report generating program 24 acquires information about the hardware or software of the second service providing device 70, it transmits a request for report generation to the device status report generating service program 69 of the first service providing device 50. The report generation request designates one or more types 44-2. Afterwards, the device status report generating service program 69 transmits a request for device status acquisition to a device status acquisition/setting service program 81 of the second service providing device 70, generates a report from its response, and sends it back to the device status report generating program 24. A data format of the device status acquisition request transmitted from the device status report generating service program 69 to the device status acquisition/setting service program 81 is identical to that of the device status acquisition request transmitted from the device status acquisition/setting service program 61 to the device status acquisition/setting service program 81.

Incidentally, the aforementioned embodiment has described, as an example, the status acquisition/setting and status monitoring of each device constituting the computer system. However, the present invention is not limited to the embodiment but can be applied to the provision of services wherein a service utilizing device has a dependent relationship between a first service and a second service so that it may widely utilize the second service through the first service.

According to the present invention, when there is a dependent relationship between services, the services can be disclosed and provided with the dependent relationship held.

What is claimed is:

1. A computer system comprising:

a first computer storing a first program;

a second computer coupled to said first computer via a network and storing one or more second programs; and a third computer coupled to said first computer via the network, a fourth computer coupled to said first computer, said second computer, and said third computer via said network, said fourth computer collecting relationship information regarding whether a dependent relationship hierarchy exists between said first program on said first computer and said one or more second programs on said second computer;

wherein, when said dependent relationship exists, said fourth computer discloses said first program to said third computer and does not disclose said second computer and said one or more second programs upon which the first program depends to said third computer, wherein said first computer:

stores association information related to the dependent relationship between said first program and said one or more second programs, receives, from said third computer, a first request for executing said first program, determines whether or not said first program depends on one or more of said second programs on the basis of said association information, executes said first program and sends a second request to said second computer when said first program depends on one or more of said second programs, said second request including instructions to execute said one or more second programs, receives execution results produced by the execution of said one or more second programs from said second computer, uses the execution results of the one or more second programs to generate a response from execution of said first program, and sends to said third computer the response generated from execution of said first program incorporating the execution results of the one or more second programs in reply to said first request, wherein said second computer receives said second request, executes said one or more second programs upon which said first program depends, and sends the execution results to said first computer without disclosure to the third computer of said second computer or said one or more second programs.

2. A computer system according to claim 1, wherein said fourth computer collects location information related to locations where said first program or said one or more second programs are stored, and provides said association information to said first computer, whereby said first computer determines whether the dependent relationship exists between said first program and the one or more second programs.

3. A computer system according to claim 1, wherein said association information is a hierarchy information indicating whether said first program is of a higher level so as to be dependent on results produced by said one or more second programs associated with said first program.

4. A computer system according to claim 3, wherein said second computer makes a request for service registration to said fourth computer for each of said one or more second programs on said second computer, said request for service registration including the hierarchy information, wherein said first computer makes a request for service registration to said fourth computer for said first program on said first computer, said request for service registration including the hierarchy information, and wherein said fourth computer provides the association information regarding which program of said first program or said one or more second programs is of a higher level than its associated program on the basis of said hierarchy information.

5. A computer system according to claim 1, wherein said execution results are respective pieces of data that a plurality of said second programs send back to said first computer, and wherein said first computer aggregates the respective pieces of data that said second programs send back into said response, and responds to said third computer.

6. A computer system according to claim 1, wherein said first request is a request for acquisition of status information about a device, and the response to the first request is the status information about said device.

* * * * *